G. B. THURBER.
Railway-Tank Apparatus.
No. 215,413. Patented May 13, 1879.
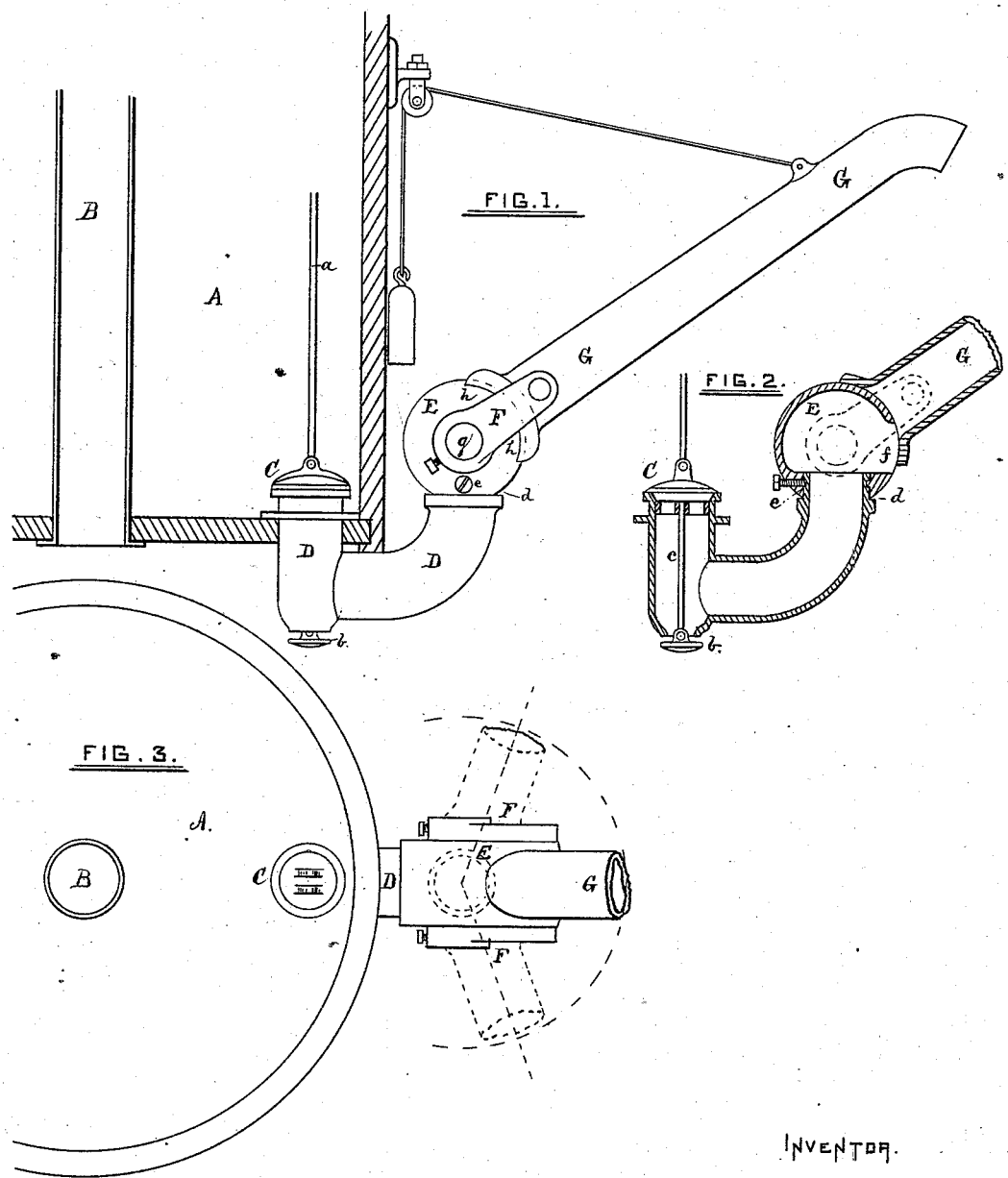
Witnesses.
N. P. Chipman
D. P. Cowl
Inventor.
George B. Thurber
By Heylmun & Kane
Ass. Attorneys

UNITED STATES PATENT OFFICE.

GEORGE B. THURBER, OF UPTON, QUEBEC, CANADA, ASSIGNOR TO JOHN ADOLPHUS THURBER, OF NEW ORLEANS, LOUISIANA.

IMPROVEMENT IN RAILWAY-TANK APPARATUS.

Specification forming part of Letters Patent No. 215,413, dated May 13, 1879; application filed February 25, 1879.

*To all whom it may concern:*

Be it known that I, GEORGE BENSON THURBER, of the village of Upton, in the county of Bagot, Province of Quebec, and Dominion of Canada, contractor, have invented certain new and useful Improvements in Railway-Tank Apparatus; and I do hereby declare that the following is a full, clear, and exact description thereof, reference being had to the annexed drawings.

The object of my invention is to provide a more perfect means than any hitherto in use for supplying water to the tenders of locomotives at stations, by constructing the supply-pipe in the simplest and most efficient manner, with a universal joint at the end next the tank, and by arranging the valves so as to drain the pipes by the action of shutting the supply-valve. By this means the water can be delivered into the tenders with equal facility and expedition whatever may be their relative height with regard to the tank, and without requiring their respective positions to be exactly adjusted; also, the danger of bursting the pipes in winter is obviated by the self-acting arrangement of the escape-valve, thus rendering the drainage of the pipes independent of the care of the attendant.

In the drawings, Figure 1 is a vertical section of the water-tank fitted with my new improvements; Fig. 2, a section of the universal joint and valves detached, and Fig. 3 a plan of the whole apparatus.

Letter A represents the tank; B, a pipe for heating the water by a stove during winter; C, the valve for supplying water to tenders; D, pipe with double valve-seats; $a$, rod to work the supply-valve C by a lever or otherwise, extending outside the tank; $b$, a valve arranged at lower end of pipe D for drainage. This valve is connected with the valve C by the rod $c$, so that when the one valve is closed the other is open. The valve $b$, however, which may be of any suitable form, dimensions, or construction, may be disconnected and secured to its seat, so as to be available for drainage only when required during winter.

The pipe D is formed with an elbow-branch, the upper surface of which, at $d$, is turned and faced truly to form a water-tight connection for the universal joint E, which is held in place by the groove and pin $e$, at the same time allowing for motion freely in the horizontal plane.

The universal joint E is of a cylindrical form, and is turned and faced truly in the lathe on its periphery and ends, and is also bored to fit the end $d$ of the supply-pipe D. It is also formed with a square or oblong opening, $f$, in its exterior periphery, of an area corresponding to that of the supply-pipe, and also with cylindrical projections $g\ g$ on each face, fitted to receive the arms F F, for connecting the movable delivery-pipe G with the fixed supply-pipe D.

The inner end of the delivery-pipe G is faced truly to fit water-tight to the periphery of the cylindrical piece E, and, to prevent lateral displacement, is provided with projections $h\ h$, fitting tightly to, but adapted to move freely on, the faces of the cylindrical piece E.

By these arrangements it will be seen that the delivery-pipe G is capable of free and unrestricted motion, both horizontally and vertically, while at the same time preserving a water-tight connection with the fixed supply-pipe D, thereby admitting of the delivery of water to the tenders without leakage or straining of the parts, whatever position the tender may occupy with regard to the tank, provided it is within the range of the delivery-pipe horizontally or vertically; also, by the self-acting arrangement of the drainage-valve, it will be seen that no danger can arise from the freezing of the pipes during winter.

Having thus fully described the nature of my inventions, what I claim as new, and desire to secure by Letters Patent, is as follows, viz:

In combination with a railway-station water-tank, having a pipe, D, for the supply of water attached thereto, a universal joint connecting the fixed supply-pipe D with the movable delivery-pipe G, said joint being formed by the piece E, fitted water-tight to the pipes D and G, and connected with the same, respectively, by the groove and pin $e$, and arms F F, with cylindrical projections $g\ g$, substantially as and for the purposes specified.

In testimony that I claim the foregoing as my own I affix my signature in presence of two witnesses.

Montreal, 27th August, 1878.

GEORGE BENSON THURBER. [L. S.]

In presence of—
   CHARLES ROBB,
   GEORGE OGILVY MOFFATT,
      *Of the city of Montreal, Gentleman.*